United States Patent [19]

Miyaji et al.

[11] Patent Number: 4,521,908

[45] Date of Patent: Jun. 4, 1985

[54] PHASED-ARRAY SOUND PICKUP APPARATUS HAVING NO UNWANTED RESPONSE PATTERN

[75] Inventors: Naotaka Miyaji, Yamato; Atsushi Sakamoto; Makoto Iwahara, both of Sagamihara, all of Japan

[73] Assignee: Victor Company of Japan, Limited, Yokohama, Japan

[21] Appl. No.: 528,100

[22] Filed: Aug. 31, 1983

[30] Foreign Application Priority Data

| | | | |
|---|---|---|---|
| Sep. 1, 1982 | [JP] | Japan | 57-152470 |
| Oct. 7, 1982 | [JP] | Japan | 57-176833 |
| Oct. 7, 1982 | [JP] | Japan | 57-176834 |
| Oct. 7, 1982 | [JP] | Japan | 57-176835 |

[51] Int. Cl.[3] ............ H04M 1/20

[52] U.S. Cl. ............ 381/92

[58] Field of Search ............ 381/92; 179/121 D

[56] References Cited

U.S. PATENT DOCUMENTS

| | | | |
|---|---|---|---|
| 4,072,821 | 2/1978 | Bauer | 381/92 |
| 4,308,425 | 12/1981 | Momose | 381/92 |
| 4,485,484 | 11/1984 | Flanagan | 381/92 |

FOREIGN PATENT DOCUMENTS

| | | |
|---|---|---|
| 263871 | 8/1968 | Austria . |
| 1139152 | 11/1962 | Fed. Rep. of Germany . |
| 1282091 | 11/1968 | Fed. Rep. of Germany . |
| 2439331 | 3/1976 | Fed. Rep. of Germany . |
| 2651786 | 5/1978 | Fed. Rep. of Germany . |

*Primary Examiner*—Gene Z. Rubinson
*Assistant Examiner*—L. C. Schroeder
*Attorney, Agent, or Firm*—Cushman, Darby & Cushman

[57] ABSTRACT

In a phased-array sound pickup apparatus microphones are divided into a first and second subarrays, the microphones of the first subarray having individual unidirectional response patterns oriented on one side of the normal to the array and the microphones of the second subarray having their response patterns oriented on the other side of the normal so that the array's main lobe assumes different orientation from the orientation of the microphone's individual response patterns so that the array's unwanted back lobe falls outside of the microphone's response patterns. The microphones may be grouped into a plurality of pairs and the signals from the paired microphones are mixed so that different individual response patterns are generated in correlation with the array's main front lobe to cause the unwanted back lobe to occur outside of the individual response patterns.

18 Claims, 26 Drawing Figures

PHASED-ARRAY SOUND PICKUP APPARATUS HAVING NO UNWANTED RESPONSE PATTERN

BACKGROUND OF THE INVENTION

The present invention relates generally to phased-array sound pickup apparatus, and in particular to a a phased-array sound pickup apparatus having no unwanted back lobe.

A phased-array sound pickup apparatus has been proposed. The apparatus comprises an array of successively arranged microphones having unidirectional directivity or response patterns which are oriented in equal direction. The signals from the individual microphones are coupled through a switching unit to a tapped incremental variable delay line so that incremental delays are introduced to the signals, which are combined at an output terminal in a desired phase relationship. This results in an array's sharp directivity pattern or main front lobe which can be steered in response to a delay control signal applied to the delay line. However, an unwanted back lobe occurs behind the microphone array with the result that it interferes with the wanted signal.

SUMMARY OF THE INVENTION

The invention obviates the aforesaid disadvantage by a circuit arrangement that causes the unwanted response pattern or back lobe to occur outside of the individual response patterns of the microphones so that the apparatus is not affected by the back lobe.

According to a first aspect of the invention, a phased-array sound pickup apparatus comprises an array of microphones having a first subarray of microphones and a second subarray of microphones. The microphones of the first subarray have individual unidirectional response patterns oriented on one side of the normal to the array, the microphones of the second subarray having individual unidirectional response patterns oriented on the other side of said normal. A tapped variable delay line having a plurality of successively connected variable delay circuits is provided. The taps between successive delay circuits are coupled respectively through a plurality of switches in a first switched position to the microphones of the first subarray such that the signal from the microphone located at one end of the first subarray opposite to the orientation of the first subarray microphones is given a maximum delay, the taps being further coupled respectively through the switches in a second switched position to the microphones of the second subarray such that the signal from the microphone located on one end of the second subarray opposite to the orientation of the second subarray microphones is given a maximum delay, whereby incremental variable delays are introduced to the signals from the microphones so that the array has a main front lobe oriented on one side of the normal to the array when the switches are transferred to the first terminals and the main front lobe is oriented on the other side of the normal when the switches are transferred to the second terminals.

The delayed signals are combined at an output terminal in a phased relationship dependent on the amount of delay introduced by each of the delay circuits. The tapped variable delay line is controlled by a delay control circuit which also controls the switches in response to a manually adjustable setting.

The array's main front lobe is thus steered at a variable angle which differs from the angle of orientations of the microphones' individual response patterns so that the array's back lobe falls outside of the microphones' individual response patterns and thus produces no interference with the wanted signal which appears at the output terminal.

According to a second aspect of the invention, a phased-array sound pickup apparatus comprises an array of microphones divided into a plurality of pairs of first and second microphones. A mixing circuit is provided for each microphone pair for mixing signals from the paired microphones in a variable proportion. A tapped variable delay line having a plurality of successively connected variable delay circuits is provided. The taps between successive delay circuits are coupled respectively via said switches to the mixing circuits to introduce incremental variable delays to signals therefrom so that the array has a main front lobe oriented on one side of the normal to the array when the switches are in the first switched position and the main front lobe is oriented on the other side of said normal when said switches are in the second switched position. Each delay circuit is controlled by a delay control circuit which also controls the switches in response to a manually adjusted setting. The delayed signals are combined at an output terminal in a phased relationship dependent on the amount of delay introduced by each of said delay circuits. The mixing proportion is controlled in relation to the amount of delay introduced to each of said delay circuits so that the array's back lobe falls outside the microphones' individual response patterns.

BRIEF DESCRIPTION OF THE DRAWINGS

The present invention will be described in further detail with reference to the accompanying drawings, in which.

Figure 3:
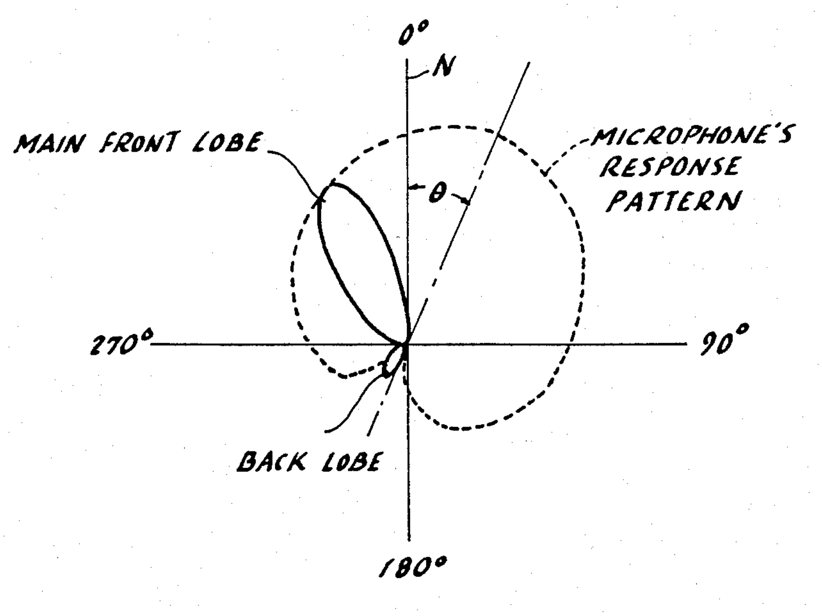
Figure 5:
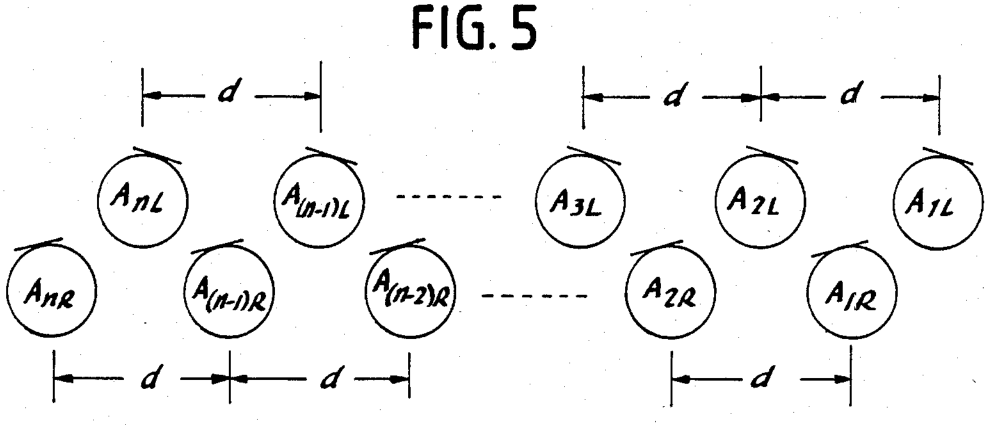
Figure 6:
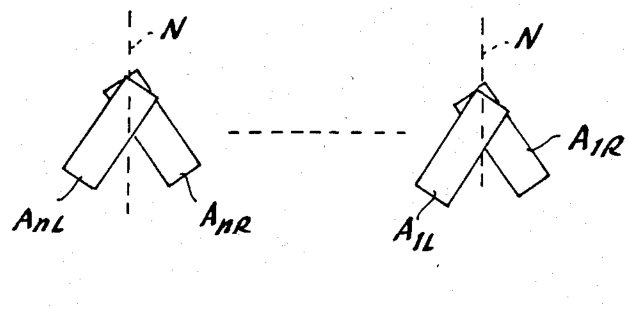
Figure 7:
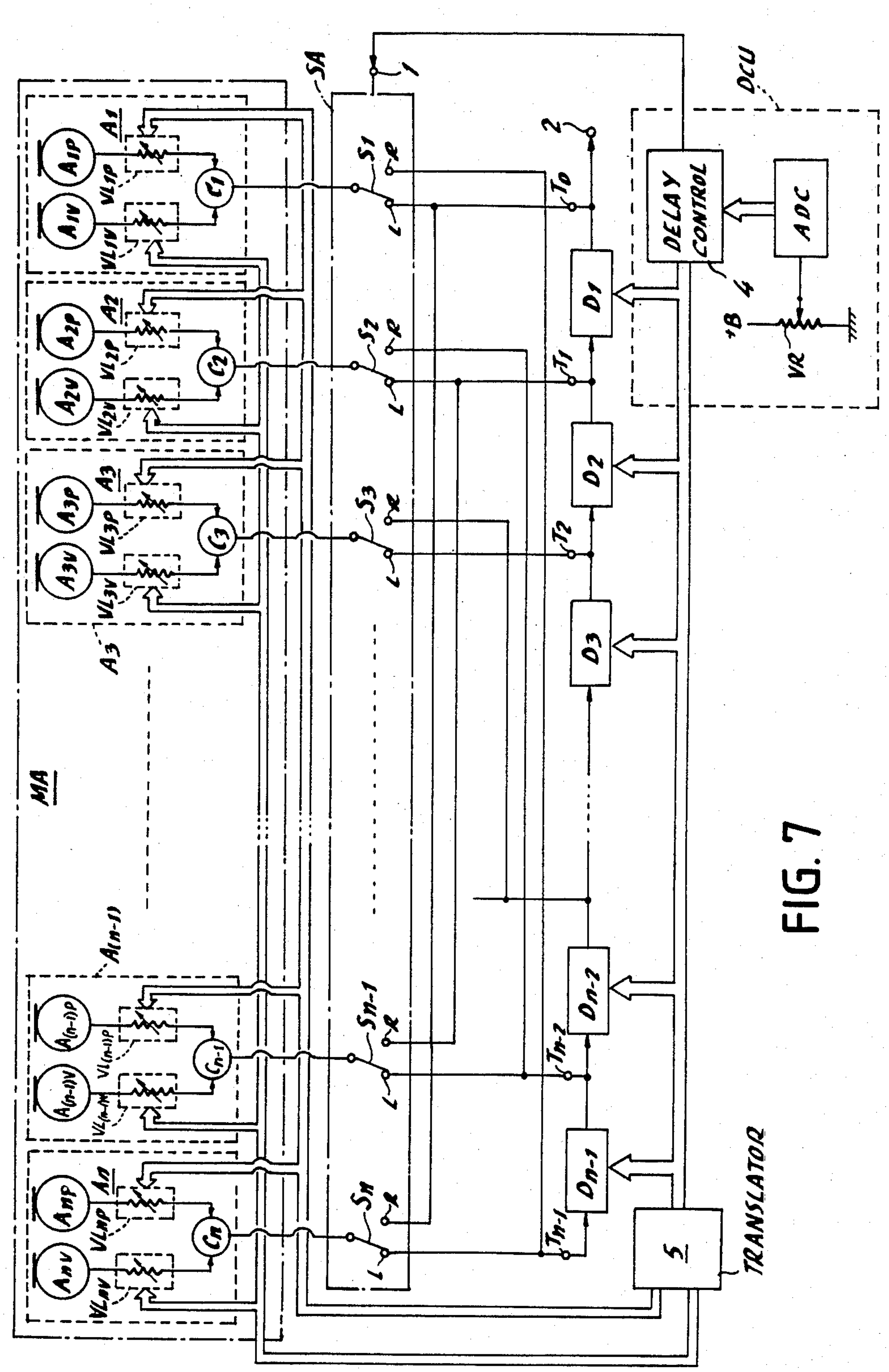
Figure 9:
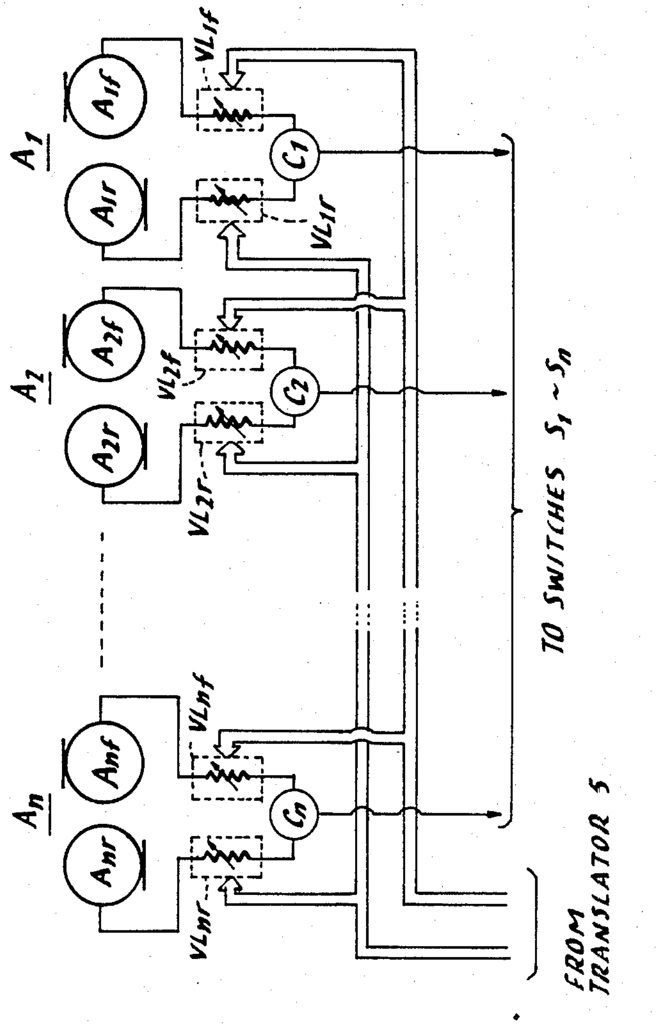
Figure 11:
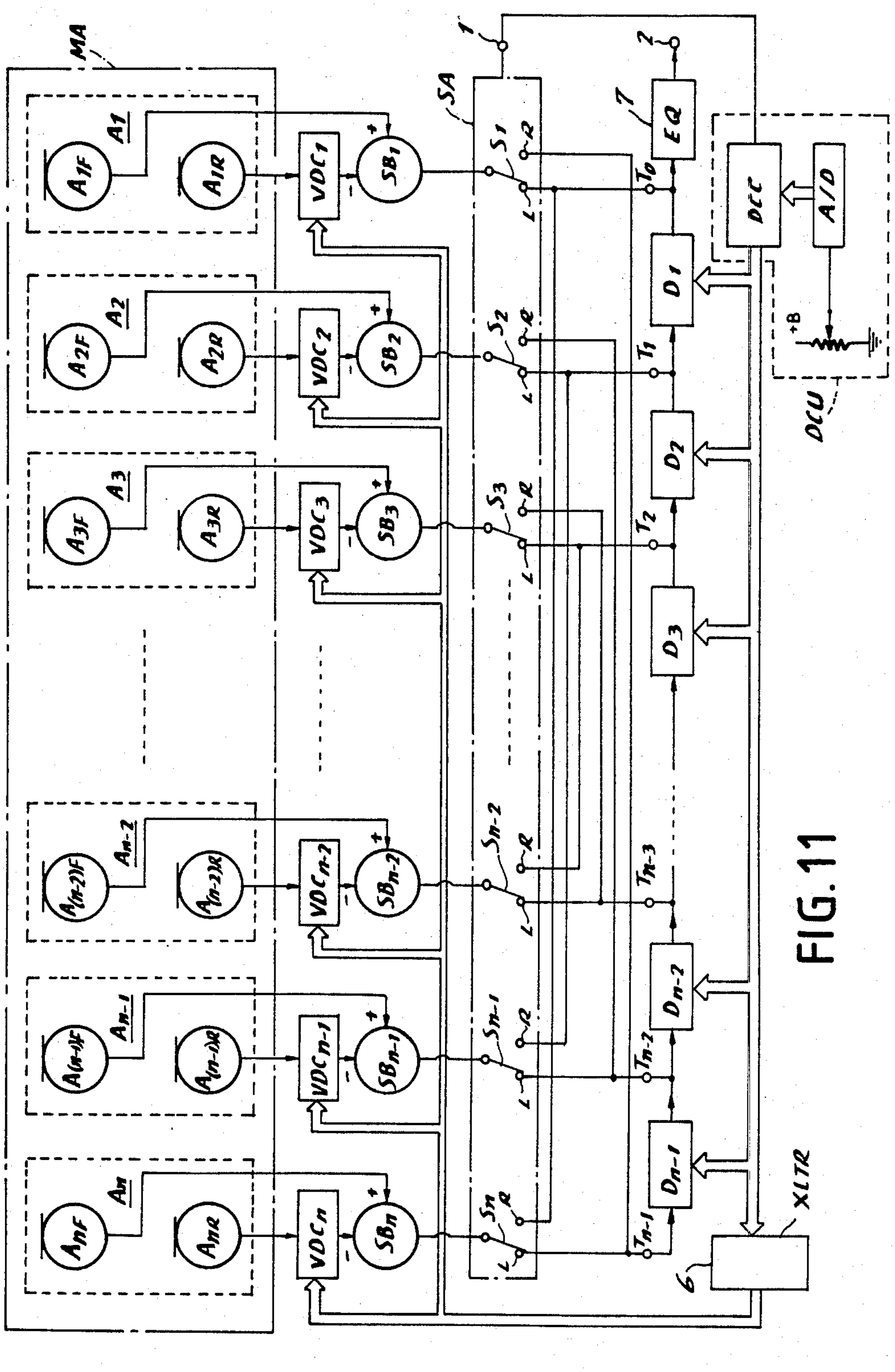
Figure 12A:
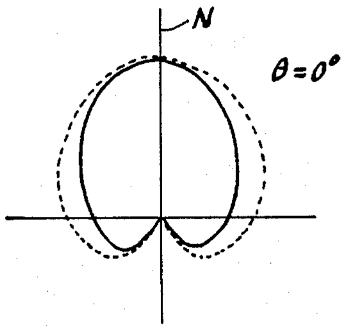
Figure 12B:
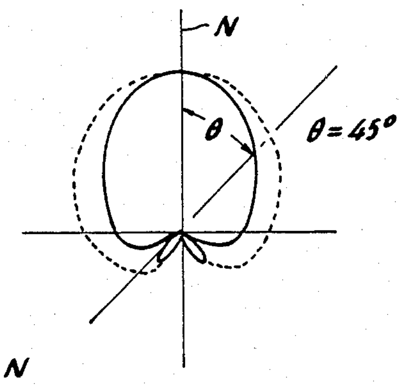
Figure 12C:
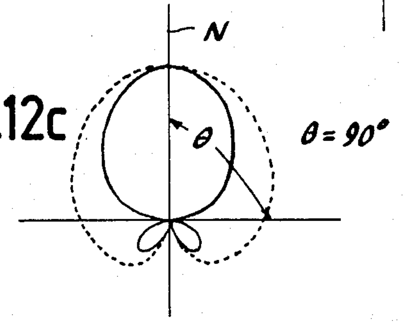
Figure 13A:
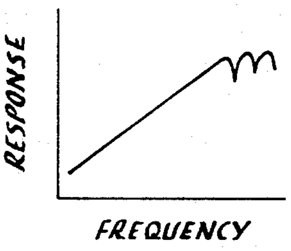
Figure 13B:
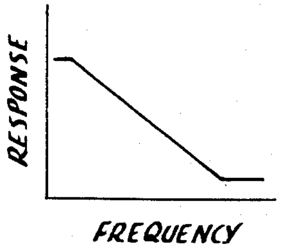

FIGS. *2a* and *2b* are illustrations of the individual microphones oriented according to the first embodiment;

FIG. 3 is an illustration of an array's response pattern overlapping a microphone's directional response pattern;

FIGS. *4a* and *4b* are illustrations of modified microphone arrays;

FIG. 5 is an illustration of a modified arrangement of the individual microphones;

FIG. 6 is an illustration of a further modification of the microphone arrangement;

FIG. 7 is a block diagram of a second embodiment of the phased-array sound pickup apparatus;

FIGS. *8a* to *8e* are illustrations of the microphone's individual response patterns according to the second embodiment;

FIG. 9 is a block diagram of a third embodiment of the phased-array sound pickup apparatus;

FIGS. 10*a* to 10*e* are illustrations of the microphone's individual response patterns according to the third embodiment;

FIG. 11 is a block diagram of a fourth embodiment of the phased-array sound pickup apparatus;

FIGS. 12*a* to 12*c* are illustrations of the microphone's individual response patterns according to the fourth embodiment; and FIGS. 13*a* and 13*b* are illustrations of the frequency characteristic of delayed signals and the frequency response of an equalizer associated with the fourth embodiment.

DETAILED DESCRIPTION

Figure 1:
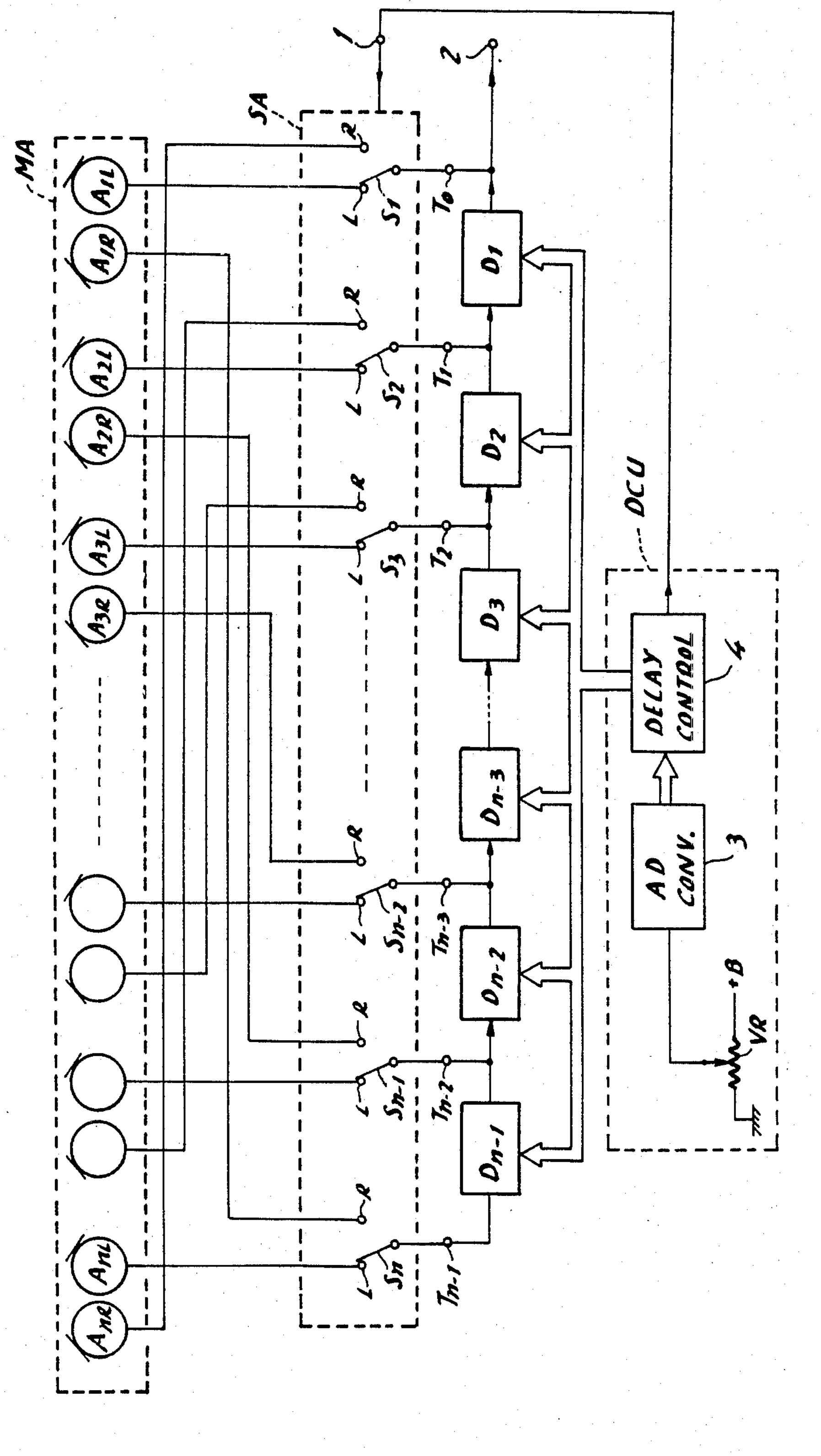
FIG. 1 is a block diagram of a first embodiment of the phased-array sound pickup apparatus.
Figure 2A:
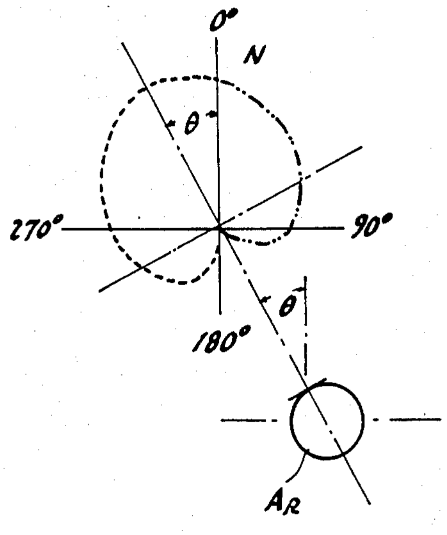
Figure 2B:
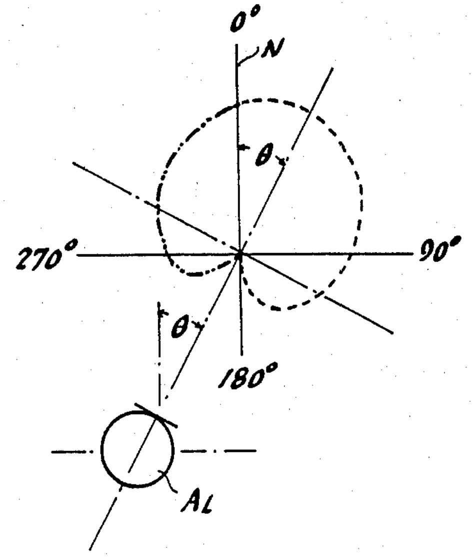

Referring now to FIG. 1, there is shown a phased-array sound pickup apparatus according to a first embodiment of the invention. The apparatus comprises a linear array of microphones MA each having a unidirectional cardioid response pattern, a switching unit SA and a tapped delay line including successively connected delay circuits $D_1$ to $D_{n-1}$, and a delay control unit DCU. The microphone array MA comprises a first subarray of microphones $A_{1L}$ to $A_{nL}$ and a second subarray of microphones $A_{1R}$ to $A_{nR}$, the microphones of each subarray being alternately arranged with those of the other subarray. As illustrated in FIG. 2*a*, the first subarray microphones $A_{1L}$ to $A_{nL}$ are positioned so that their cardioid response patterns are directed at an angle $\theta$ to the right of the normal N to the microphone array in order to direct the front response pattern or main lobe of the array to the left of the normal N in a manner as will be described. On the other hand, the second subarray microphones $A_{1R}$ to $A_{nR}$ are positioned so that their cardioid response patterns are directed at an angle $\theta$ to the left of the normal N as shown in FIG. 2*b* in order to direct the main lobe of the array to the right of the normal N. The first subarray microphones $A_{1L}$ to $A_{nL}$ are connected to the leftside terminals L of switches $S_1$ to $S_n$, respectively, while the second subarray microphones $A_{1R}$ to $A_{nR}$ are connected to the rightside terminals of the switches $S_n$ to $S_1$, respectively, as illustrated. The moving contacts of the switches $S_1$ to $S_n$ are switched simultaneously to the leftside or rightside terminals in response to a binary 1 or 0 applied to a switching control terminal 1. The moving contacts of the switches $S_1$ to $S_n$ are coupled to taps $T_0$ to $T_{n-1}$ of the delay line, respectively. The delay circuits $D_1$ to $D_{n-1}$ are connected in series between the taps $T_0$ and $T_{n-1}$, the connections between successive delay circuits being connected respectively to taps $T_1$ through $T_{n-2}$. Each of the delay circuits comprises a set of four delay elements respectively having delay times t, 2t, 4t and 8t (where t is a unit delay time) and connected in series between input and output terminals of each delay circuit. These delay elements are selectively brought into circuit in response to a digital delay control signal from the delay control circuit DCU so that each delay circuit provides sixteen incremental delays.

The delay control unit DCU includes a steering control potentiometer VR providing an adjustable DC voltage on its wiping tap which is applied to an analog-digital converter 3 and a delay control circuit 4. The AD converter 3 converts the applied DC voltage to an 8-bit digital signal which is further converted by the delay control circuit 4 into a 5-bit digital signal of which the most significant bit being used as a switching control signal for application to the control terminal 1. The remainder of the 5-bits is applied to each of the delay circuits $D_1$ to $D_{n-1}$ to uniformly control the amounts of delay to a desired setting.

When the switches are positioned in the leftside terminals L, the microphones $A_{1L}$ to $A_{nL}$ are connected to the tapped delay line and for a given amount of delay the signals from such microphones are delayed by incremental delay times such that the signal from microphone $A_{1L}$ undergoes a zero or minimum delay while the signal from microphone $A_{nL}$ undergoes a maximum delay. The incrementally delayed signals are combined in a desired phase relationship at an output terminal 2 of the sound pickup apparatus. By controlling the delay time of each delay circuit from a minimum to a maximum value, the signals from the rightwardly directed microphones $A_{1L}$ to $A_{nL}$ generate a main lobe which can be steered on the rightside of the normal N to as much as 90 degrees with respect thereto. Since the individual response patterns of the microphones $A_{1L}$ to $A_{nL}$ are oriented to the right of the normal while the array's main lobe is oriented to the left of the normal as indicated by a solid line in FIG. 3, the back lobe of the array falls outside the individual response pattern which is indicated by a dotted line.

Likewise, when the switches are positioned in the rightside terminals R, the microphones $A_{1R}$ to $A_{nR}$ are connected to the tapped delay line and the signals from such microphones are delayed by incremental delay times so that the signal from microphone $A_{1R}$ undergoes a maximum delay while the signal from microphone $A_{nR}$ undergoes a minimum delay. By controlling the delay time of each delay circuit from a minimum to a maximum value, the signals from the leftwardly directed microphones $A_{1R}$ to $A_{nR}$ generate a main lobe which can be steered on the leftside of the normal N to as much as 90 degrees with respect thereto. The back lobe of the array falls outside the individual response patterns of the leftwardly oriented microphones $A_{1R}$ to $A_{nR}$.

Figure 4A:
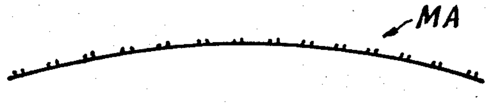
Figure 4B:
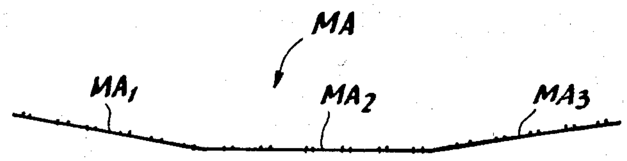

The microphone array MA could equally be as well configured as illustrated in FIGS. 4*a* and 4*b*. In FIG. 4*a*, the array is forwardly convexed, and in FIG. 4*b* the array is segmented into three linear subarays MA1, MA2 and MA2 with the subarrays MA1 and MA3 being tilted inwardly forward. These alternative arrangements provide an advantage in that they prevent the main lobe of the array from being excessively sharpened for reception of acoustic energy in the higher frequency range of the audio spectrum.

In a practical embodiment, the microphones of each subarray are spaced apart a distance "d" which is smaller than the half-wavelength of the highest audio frequency. If the size of the microphones is too large for them to be spaced apart such distance, it is desirable that the microphones of each subarray be arranged in a staggered relationship with those of the other along the array while maintaining the required spacing "d" between the microphones of the same subarray as illustrated in FIG. 5. Alternatively, the microphones could be arranged as shown in FIG. 6 in which the microphones of one subarray are mounted on the corresponding microphones of the other subarray and tilted horizontally in a manner as discussed above.

Figure 8A:
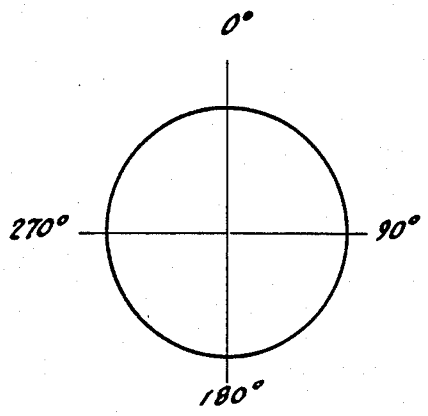
Figure 8B:
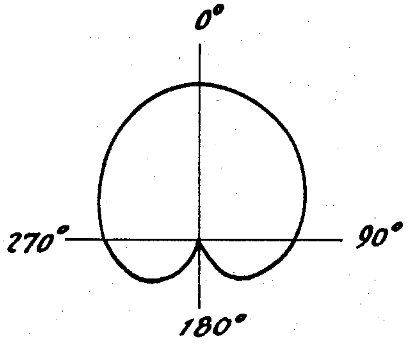
Figure 8C:
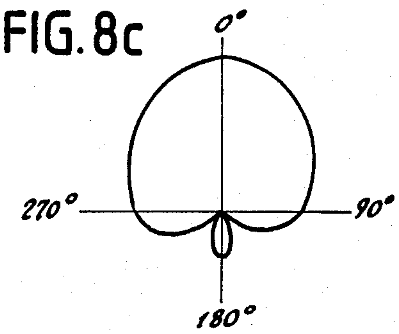
Figure 8D:
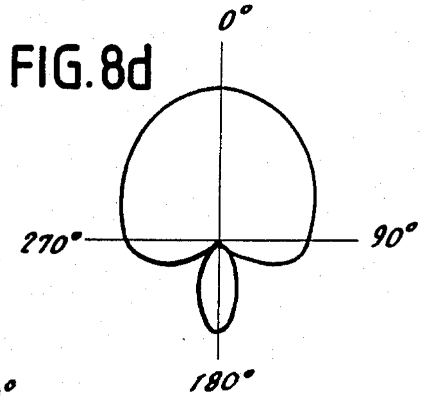
Figure 8E:
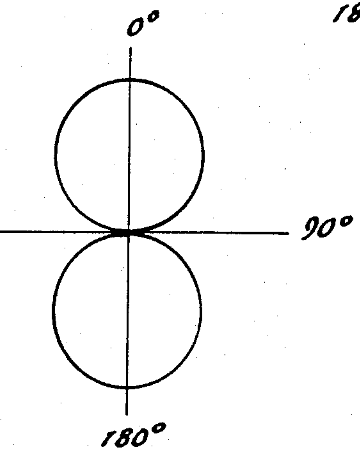

FIG. 7 is an illustration of a second embodiment of the present invention in which the microphone array MA comprises a plurality of microphone pairs $A_1$ to $A_n$ each including a pressure microphone $A_p$ and a velocity microphones $A_v$. The pressure microphones $A_{1p}$ to $A_{np}$ are arranged alternately along the array with the velocity microphones $A_{1v}$ to $A_{nv}$. The pressure microphone is of an omnidirectional type having a response pattern as shown at FIG. 8*a*, while the velocity microphones have a figure-eight response pattern as shown at FIG. 8*e*. The pressure microphone $A_p$ of each pair is connected through a digital variable-loss circuit $VL_p$ to a combiner C to which the velocity microphone $A_v$ of the same pair is also connected through a digitral variable-loss circuit $VL_v$. Under certain circumstances it is desirable that the microphones of each pair be stacked one upon the other to meet the spacing requirement.

The outputs of the combiners $C_1$ to $C_n$ are connected to the moving contacts of switches $S_1$ to $S_n$, respectively. The leftside terminals L of switches $S_1$ to $S_n$ are coupled respectively to the taps $T_0$ through $T_{n-1}$ of the tapped delay line and the rightside terminals R of switches $S_1$ through $S_n$ are coupled to the taps $T_{n-1}$ through $T_0$, respectively.

Each of the variable-loss circuits is controlled by a digital signal derived from a digital translator 5 which is coupled to the output of the delay control circuit 4. The digital translator 5 converts the delay control signal from the circuit 4 to a pair of loss control signals which adjust the variolossers $VL_p$ and $VL_v$. When the variolossers are adjusted so that the signal from a given pressure microphois reduced to zero signal level, the resultant response pattern of the microphone pair will appear as shown at FIG. 8*a*. Conversely, if the situation is reversed the resultant response pattern will appear as shown at FIG. 8*e*. With the variolossers being equally adjusted, the combined response pattern will appear as shown at FIG. 8*b* which is substantially identical to a cardioidal pattern. It will be seen therefore that by appropriately varying the relative loss values of the variolossers the combined response pattern of each microphone pair will vary as shown at FIGS. 8*c* and 8*d* and that the insensivity area of the microphone pair varies in shape as a function of the adjustment of the associated variolossers.

As in the first embodiment discussed above, the delay and switching control signals from the circuit 4 enable the main front lobe of the array to be steered to a desired angle over the range of 90 degrees on each side of the normal N to the array. Since the back lobe of the array forms in a location which is in a mirror image relationship with the front lobe with respect to the length of the array, the translator 5 provides correlation of its input and output signals so that the back lobe of the array may fall outside of the individual response patterns of the microphone pairs which are determined by the output signal.

Figure 10A:
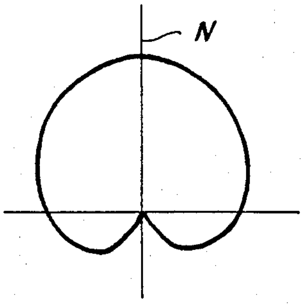
Figure 10B:
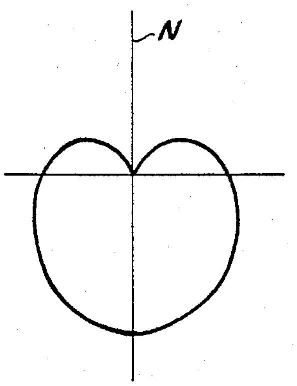
Figure 10C:
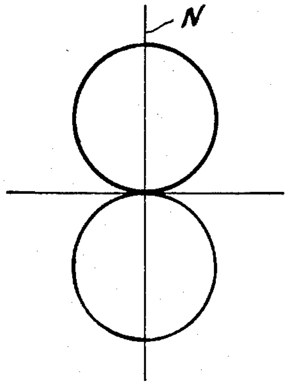
Figure 10D:
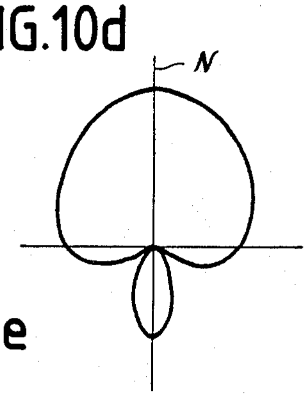
Figure 10E:
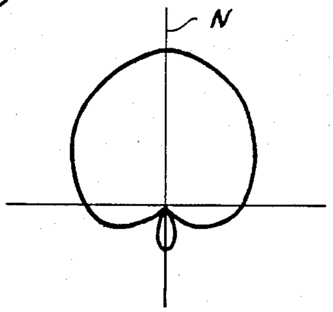

FIG. 9 is an illustration of a third embodiment of the invention which is similar to that shown in FIG. 7 with the exception that each microphone pair comprises a front-facing unidirectional microphone $A_f$ and a rear-facing unidirectional microphone $A_r$ instead of the pressure and velocity microphones. The individual response patterns of the microphones $A_f$ and $A_r$ are shown respectively in FIGS. 10*a* and 10*b*. The proportioning control of the associated variolossers results in a combined response pattern for each microphone pair which takes different configurations as shown at FIGS. 10*c* to 10*e*. If the variolossers are adjusted to an equal setting, the combined individual pattern will appear as a figure-eight pattern (FIG. 10*c*), and if they are adjusted so that the signal from the rear-facing microphone is more attenuated than the signal from the front-facing microphone, the combined pattern will appear as shown at FIG. 10*d* and an increase in the ratio between these signals would result in a pattern shown at FIG. 10*e*. As in the FIG. 7 embodiment, the variolossers are controlled so that the array's back lobe may fall outside of the variable response patterns of the individual microphone pairs.

FIG. 11 is an illustration of a fourth embodiment of the invention which is similar to that shown in FIG. 7 with the exception that each microphone pair comprises a frontal microphone $A_F$ and a rear microphone $A_F$ spaced a distance dv from the frontal microphone $A_F$ and these microphones are of a unidirectional type having a cardioid or hypercardioid pattern. The rear microphones $A_{1R}$ through $A_{nR}$ are respectively connected to digitally controlled variable delay circuits $VDC_1$ to $VDC_n$ whose outputs are connected to the negative inputs of subtractors $SB_1$ through $SB_n$, respectively. The outputs of the frontal microphones $A_{1F}$ through $A_{nF}$ are connected to the positive terminals of the subtractors $SB_1$ to $SB_n$, respectively.

The variable delay circuits $VDC_1$ through $VDC_n$ are controlled by an output signal from a second delay circuit 6 which is connected from the output of the first delay control circuit 4. The second delay control circuit 6 is a translator which converts its input to a digital value $Ti=(dv \cos O)/c$, where $\theta$ is the angle of the the array's main lobe with respect to the normal N to the array and c is the velocity of sound. In response to the output of the delay control circuit 4 the translator 6 controls the Ti value so that the signals combined in the subtractors result an array's main front lobe being steered at an angle O to the normal N to the array.

FIGS. 12*a* to 12*c* are illustrations of individual response patterns of the microphone pairs with the array's main front lobes being angulated at zero-degree, 45-degree and 90-degree with respect to the normal N, respectively, when use is made of cardioid microphones for each pair whose directivity patterns are indicated by dotted lines. Since the array's back lobe forms in a mirror-image relationship with the array's front main lobe, it is seen that the back lobe falls outside of the response pattern of the individual microphones.

Due to the spaced relationship between the front and rear microphones, the output signals from the subtractors has a lower response in the lower frequency range of the spectrum, typically with a rate of 6 dB/octave, as shown at FIG. 13*a*. An equalizer 7 having a complementary response as shown at FIG. 13*b* is connected to the output terminal 2 to compensate for this frequency response.

What is claimed is:

1. A phased-array sound pickup apparatus comprising:

an array of microphones having a first subarray of microphones and a second subarray of microphones, the microphones of said first subarray having individual unidirectional response patterns oriented on one side of the normal to said array and the microphones of said second subarray having individual unidirectional response patterns oriented on the other side of said normal;

a plurality of switches each having first and second switched positions;

a tapped variable delay line having a plurality of successively connected variable delay circuits with taps between successive ones of said delay circuits, said taps being coupled respectively through said switches in the first switched position to the microphones of said first subarray such that the signal from the microphone located at one end of the first subarray opposite to the orientation of said first subarray microphones is given a maximum delay, said taps being further coupled respectively through said switches in said second switched position to the microphones of said second subarray such that the signal from the microphone located on an end of the second subarray opposite to the orientation of the second subarray microphones is given a maximum delay, whereby incremental variable delays are introduced to the signals from said microphones so that the array has a main front lobe oriented on one side of the normal to said array when the switches are transferred to the first terminals and said main front lobe is oriented on the other side of said normal when said switches are transferred to the second terminals, the delayed signals being combined at an output terminal in a phased relationship dependent on the amount of delay introduced by each of said delay circuits; and a delay control circuit for controlling said variable delay circuits and said switches in response to a manually adjustable setting.

2. A phased-array sound pickup apparatus as claimed in claim 1, wherein the microphones of each of said subarrays are arranged alternately with those of the other subarray.

3. A phased-array sound pickup apparatus as claimed in claim 1, wherein said microphones of each of said subarrays are arranged in a staggered relationship with those of the other subarray.

4. A phased-array sound pickup apparatus as claimed in claim 1, wherein said microphones of one of said subarrays are respectively stacked on those of the other subarray.

5. A phased-array sound pickup apparatus as claimed in claim 1, wherein said array is curved to present a convexed surface to incident acoustic energy.

6. A phased-array sound pickup apparatus as claimed in claim 1, wherein said array is divided into plural linear subarrays angulated to each other.

7. A phased-array sound pickup apparatus comprising:

an array of microphones divided into a plurality of pairs of first and second microphones;

a plurality of mixing circuits for mixing signals from the paired microphones in a variable proportion;

a plurality of switches each having first and second switched positions;

a tapped variable delay line having a plurality of successively connected variable delay circuits having taps connected between successive ones of said delay circuits, said taps being coupled respectively via said switches to said mixing circuits to introduce incremental variable delays to signals from the mixing circuits so that the array has a main front lobe oriented on one side of the normal to said array when the switches are in the first switched position and said main front lobe is oriented on the other side of said normal when said switches are in the second switched position, the delayed signals being combined at an output terminal in a phased relationship dependent on the amount of delay introduced by each of said delay circuits; and delay control means for controlling said variable delay circuits and said switches in response to a manually adjustable setting; and mixing control means for controlling said mixing proportion in relation to the amount of delay introduced to each of said delay circuits.

8. A phased-array sound pickup apparatus as claimed in claim 7, wherein said first and second microphones have different directivity patterns, and wherein each of said mixing circuits comprises a pair of variable loss circuits responsive to said control signal for adjusting the signals from the associated microphones, and a combiner for combining the outputs of said variable loss circuits to provide a signal as the output of said mixing circuit.

9. A phased-array sound pickup apparatus as claimed in claim 8, wherein said first microphone has an omnidirectional pattern and said second microphone has a figure-eight response pattern.

10. A phased-array sound pickup apparatus as claimed in claim 8, wherein said first and second microphones are of the type having an identical unidirectional response pattern and are arranged in opposite directions to each other.

11. A phased-array sound pickup apparatus as claimed in claim 7, wherein said first microphones are arranged alternately with said second microphones.

12. A phased-array sound pickup apparatus as claimed in claim 7, wherein said first microphones are arranged in a staggered relationship with said second microphones.

13. A phased-array sound pickup apparatus as claimed in claim 7, wherein said first and second microphones are stacked one upon the other.

14. A phased-array sound pickup apparatus as claimed in claim 7, wherein said first and second microphones are respectively located in front and rear positions with a predetermined spacing therebetween, and wherein each of said mixing circuits comprises a second variable delay circuit for introducing a variable delay to the signal from said second microphone in response to said mixing control means and a subtractor in receipt of an output signal from said second variable delay circuit and a signal from said first microphone to generate said mixed output.

15. A phased-array sound pickup apparatus as claimed in claim 14, wherein said first and second microphones have identical unidirectional response patterns oriented in a direction normal to said array.

16. A phased-array sound pickup apparatus as claimed in claim 14, further comprising an equalizer connected to said output terminal to compensate for the the frequency response characteristics of said second variable delay circuits.

17. A phased-array sound pickup apparatus as claimed in claim 7, wherein said array is curved to present a convexed surface to incident acoustic energy.

18. A phased-array sound pickup apparatus as claimed in claim 7, wherein said array is divided into plural linear subarrays angulated to each other.

* * * * *